(12) United States Patent
Myung

(10) Patent No.: US 11,689,036 B2
(45) Date of Patent: Jun. 27, 2023

(54) FREE VOLTAGE ADAPTER FOR CHARGING

(71) Applicant: BRONINE CO., LTD., Seoul (KR)

(72) Inventor: Sun Hwi Myung, Seoul (KR)

(73) Assignee: BRONINE CO., LTD., Seoul (KR)

( * ) Notice: Subject to any disclaimer, the term of this patent is extended or adjusted under 35 U.S.C. 154(b) by 18 days.

(21) Appl. No.: 17/451,286

(22) Filed: Oct. 18, 2021

(65) Prior Publication Data

US 2023/0118788 A1    Apr. 20, 2023

(51) Int. Cl.
*H02J 7/00* (2006.01)

(52) U.S. Cl.
CPC .......... *H02J 7/0042* (2013.01); *H02J 7/0013* (2013.01); *H02J 7/0048* (2020.01)

(58) Field of Classification Search
CPC ...... H02J 7/0042; H02J 7/0048; H02J 7/0013; H02J 7/00
See application file for complete search history.

(56) References Cited

U.S. PATENT DOCUMENTS

| 2014/0375268 A1* | 12/2014 | Zou ...................... H01R 31/065 320/111 |
| 2018/0316201 A1* | 11/2018 | Miller ................... H02J 7/0042 |
| 2020/0328603 A1* | 10/2020 | Walker ................... H01R 31/06 |

\* cited by examiner

*Primary Examiner* — Robert Grant
(74) *Attorney, Agent, or Firm* — Studebaker & Brackett PC

(57) ABSTRACT

The present disclosure relates to a free voltage adapter for charging, in which when the free voltage adapter is connected to a charging object for charging, a voltage required for charging the charging object is first predicted in advance, and after that, a voltage corresponding to the charging voltage of the charging object is supplied, thus with a single adapter, a plurality of different types of charging objects with different charging voltages can be charged simultaneously.

7 Claims, 4 Drawing Sheets

FREE VOLTAGE ADAPTER FOR CHARGING

BACKGROUND

1. Technical Field

The present disclosure relates to an adapter connecting a charging object, such as a battery, to a power source to be charged.

2. Description of Related Art

Unless otherwise specified herein, contents described in this section are not to be construed as constituting related art to claims of this application. In addition, although the claims are included in this section, the claims should not be recognized as a related art.

Recently, as portable electronic products, such as digital cameras, smartphones, laptop computers, and tablet personal computer (PC), have been widely used, rechargeable batteries have been used as power supply devices for smooth operation thereof even outdoors where power is not supplied in real-time. Such rechargeable batteries include lithium-ion (Li-ion) batteries and nickel-hydrogen (Ni-MH) batteries.

Such rechargeable batteries may have varying degrees of charge from a single charging operation depending on the capacity of the battery. When the battery is discharged due to long outdoor activities where real-time charging is impossible, electronic products can no longer be used.

In this case, an extra battery has to be prepared and used or the battery has to be urgently charged in a recharging location such as a nearby cafe, a government office, a vehicle, or a convenience store for continued device usage, causing user inconvenience. In addition, since the charging voltage required for charging is different for each battery, it may be inconvenient to prepare a charging adapter that can be charged according to the type of an electronic product. Moreover, when the number of capacitors is limited, there is a limit that a plurality of batteries cannot be charged simultaneously.

RELATED ART DOCUMENT

Patent Documents (Patent Document 1) Korean Patent Application Publication No. 10-1998-0066675, Oct. 15, 1998
(Patent Document 2) Korean Patent Application Publication No. 10-2015-0094974, Aug. 20, 2015
(Patent Document 3) Korean Patent Application Publication No. 10-1026223, Mar. 24, 2011

SUMMARY

An aspect of the present disclosure is directed to providing a free voltage adapter for charging, in which when the battery is connected thereto, a voltage required for charging the battery is predicted, and a required voltage is supplied, and thus, with a single adapter, a plurality of different types of batteries with different charging voltages can be charged simultaneously.

According to an embodiment of the present disclosure, the free voltage adapter for charging includes: a main body provided with two or more insertion holes on one side, a plug terminal inserted into an outlet on the other side, and a charging control circuit board provided therein; and a power cable in which when one end is detachably coupled to the insertion holes and the other end is connected to a charging object so that the one end is connected to the insertion holes, the charging object is charged by the main body in which the plug terminal is inserted into the outlet.

According to the free voltage adapter for charging as described above, when the free voltage adapter is connected to a charging object for charging, a voltage required for charging the charging object is first predicted in advance, and after that, a voltage corresponding to the charging voltage of the charging object is supplied, thus with a single adapter, a plurality of different types of charging objects with different charging voltages can be charged simultaneously.

DETAILED DESCRIPTION

The advantages and features of the present disclosure and methods of achieving them will be apparent from the embodiments that will be described in detail with reference to the accompanying drawings. It should be noted, however, that the present disclosure is not limited to the following embodiments, and may be implemented in various different forms. Rather the embodiments are provided so that this disclosure will be thorough and complete and will fully convey the scope of the present disclosure to those skilled in the technical field to which the present disclosure pertains, and the present disclosure will only be defined by the appended claims. Like reference denotations refer to like elements throughout the specification.

In addition, in the following description of the disclosure, a detailed description of well-known art or functions will be ruled out in order not to unnecessarily obscure the subject matter of the disclosure. In addition, the following terminology is defined based on a function of an embodiment of the disclosure and varied depending on the intent of an operator or a custom. Accordingly, the definition should be made based on contents throughout the specification.

Figure 1:
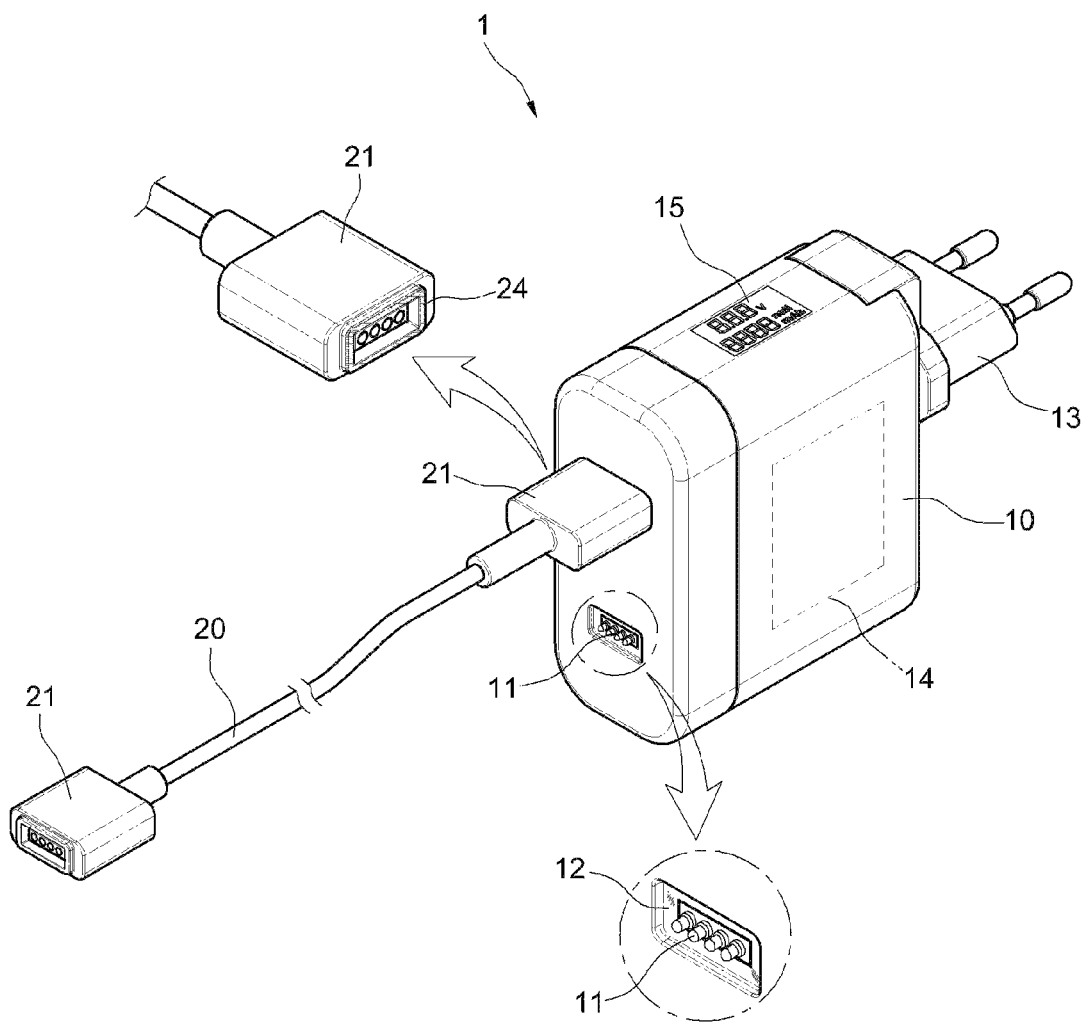
FIG. 1 is a perspective view of a free voltage adapter for charging according to an embodiment of the present disclosure.
Figure 2:
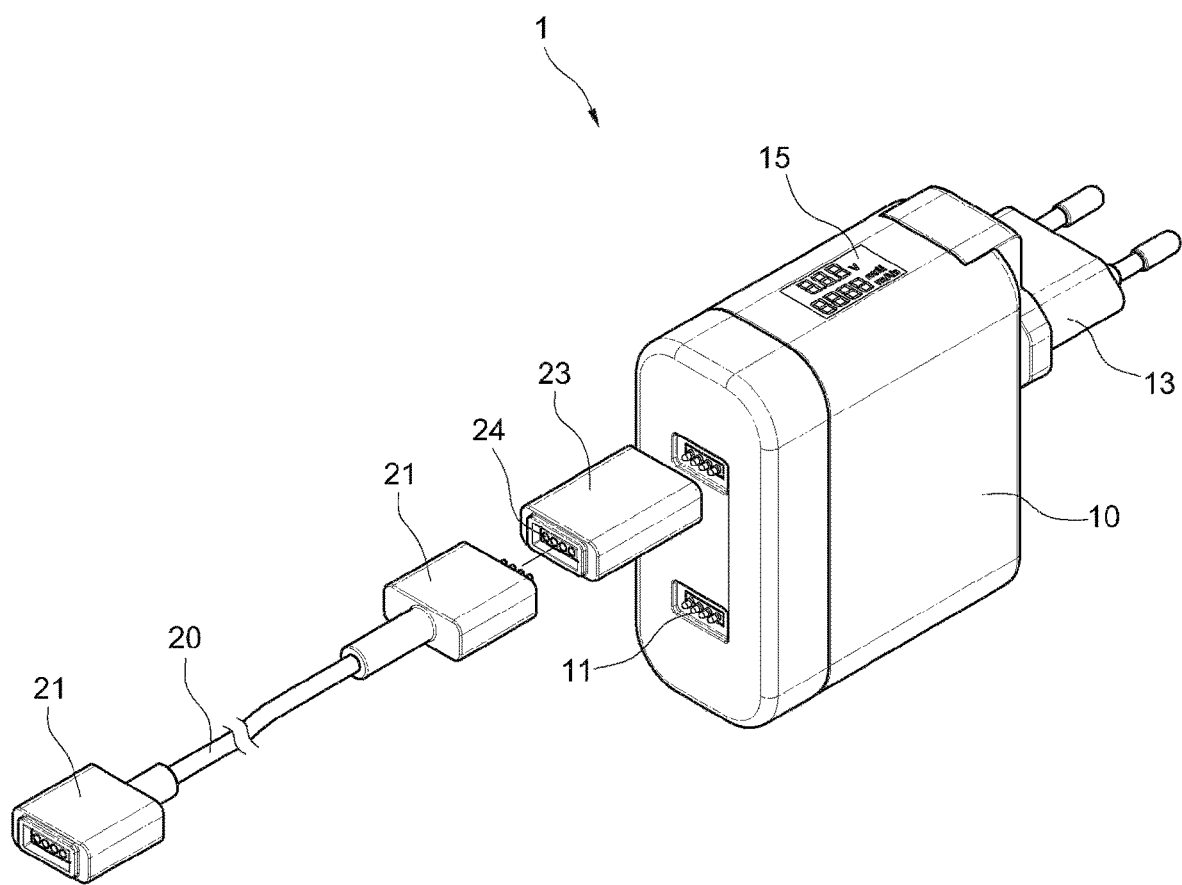
FIGS. 2 and 3 are operational views of a free voltage adapter for charging according to an embodiment of the present disclosure.
Figure 3:
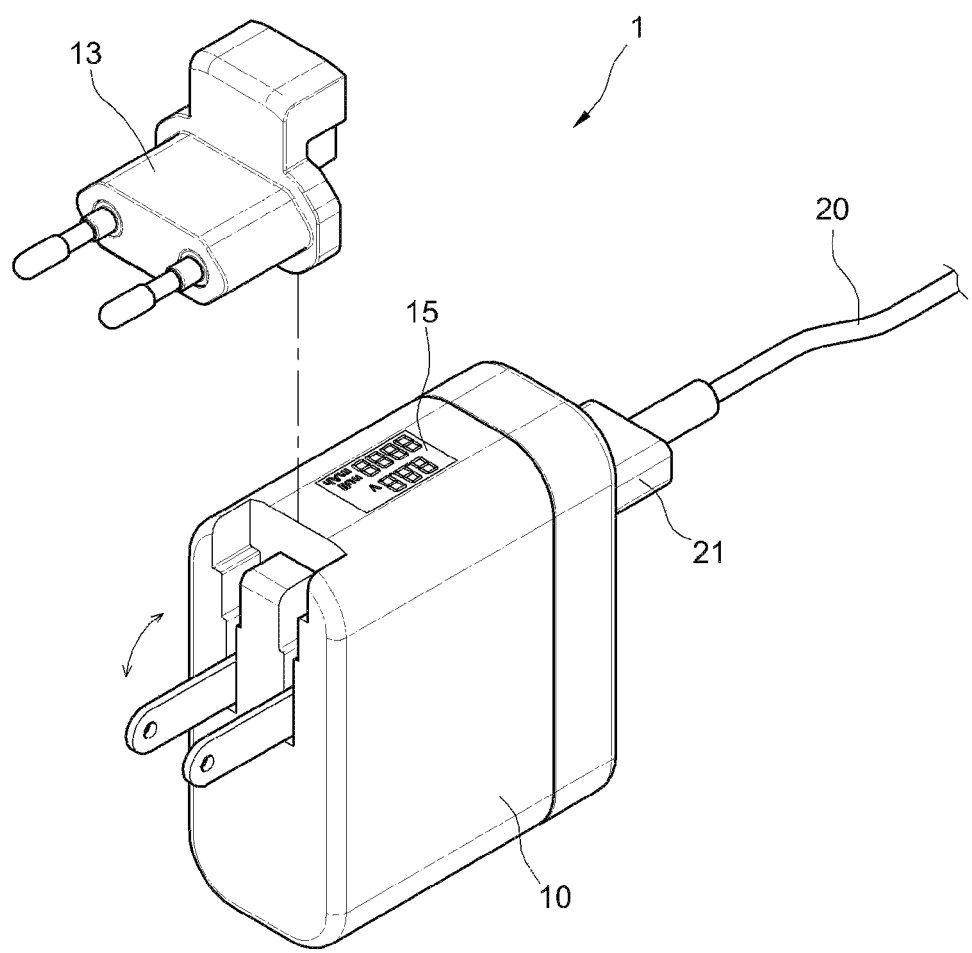
Figure 4:
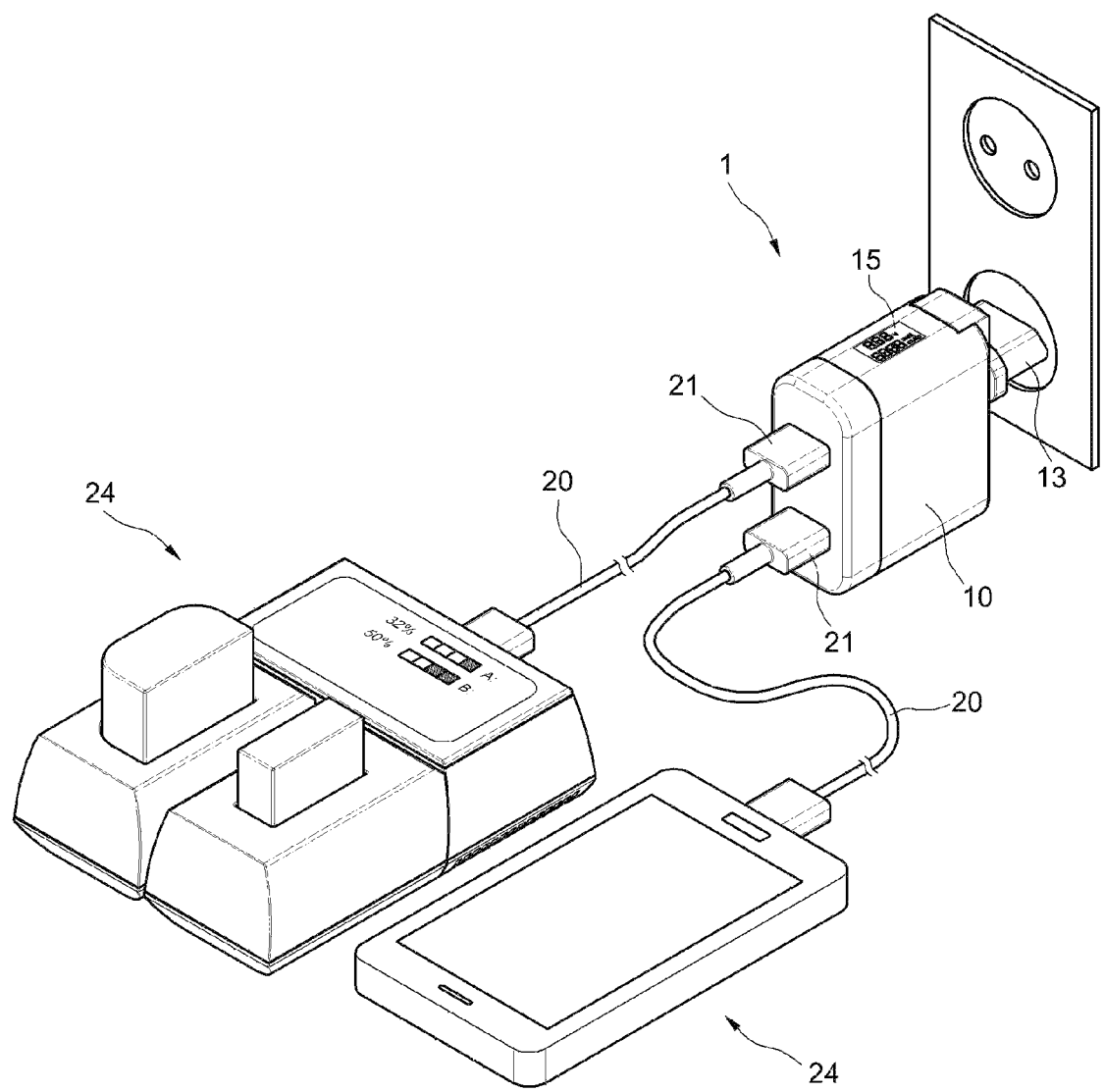
FIG. 4 is a view illustrating a use state of a free voltage adapter for charging according to an embodiment of the present disclosure.

FIGS. 1 to 4 illustrate an embodiment of the present disclosure. FIG. 1 is a perspective view, FIGS. 2 and 3 are operational views, and FIG. 4 is a view illustrating a use state.

Hereinafter, components of a free voltage adapter 1 for charging according to an embodiment of the present disclosure and the connection relationship between the components will be described in detail with reference to FIGS. 1 to 3.

Referring to FIG. 1, a main body 10 is provided. This main body 10 serves to allow a charging object 22, to be described later, to be charged. To this end, the aforementioned main body 10 is provided with two or more insertion holes 11 on one side, a plug terminal 13 inserted into an outlet on the other side, and a charging control circuit board 14 provided therein.

The aforementioned insertion hole 11 allows an insertion terminal 21 of a power cable 20, to be described later, to be detachably connected so that the main body 10 and the power cable 20 are electrically connected. Two or more of these insertion holes 11 are provided so that two or more charging objects 22 may be charged simultaneously, and the shape may be the same or may be formed differently. In addition, a metal member 12 is provided therein in order to be detachably coupled to each other through magnetic force with a magnetic body 24 provided in the insertion terminal 21 or the adapter 23, to be described later. In an embodiment of the present disclosure, the insertion hole 11 and the adapter 23, or the insertion hole 11 and the insertion terminal 21 are coupled through the magnetic force of the metal member 12 and the magnetic body 24. However, various coupling methods such as a force fitting method or a coupling method using a groove-protrusion structure may be used.

The charging control circuit board 14 provided in the aforementioned main body 10 is electrically connected to the plug terminal 13 and the insertion hole 11 to serve to control the charging process as a whole. One of them is to check the battery capacity of the charging object 22. In other words, when the charging object 22 is connected to the main body 10, a fine current flows from the charging control circuit board 14 that senses the connection to check the battery capacity of the charging object 22. Then, a charging voltage matched to the battery capacity is supplied. Accordingly, various kinds of charging objects 22 having different charging capacities and voltages may be charged by the free voltage adapter 1 for charging according to the present disclosure.

In addition, the other one is a battery life check of the charging object 22. In other words, by applying an AC signal having a single frequency to the battery side of the charging object 22 from the charging control circuit board 14, the AC impedance of the corresponding battery is measured, and the life of the battery is predicted using the same. The predicted battery life may be displayed on a display 15, to be described later. Since the method of predicting the life of a battery using such an AC signal is a presently known technology, a further detailed description thereof will be omitted for the sake of simplicity of the specification.

In addition, another one is to automatically cut off the charging voltage when charging is finished. In other words, when the charging of the charging object 22 is finished, the supply of the charging voltage is automatically cut off by the charging control circuit board 14, thereby inhibiting the charging object 22 from overheating.

In addition, a display 15 for displaying a charging state is further provided on one side of the main body 10. The abovementioned display 15 displays information related to charging such as charging state and charging time for each charging object 22, and a separate alarm may be activated when power is fully charged. Also, as described above, the battery life of the charging object 22 is displayed.

In addition, referring to FIG. 2, the power cable 20 is connected to the aforementioned insertion hole 11. The power cable 20 serves to supply power required for charging the charging object 22 by allowing the main body 10 and the charging object 22 to be electrically connected. The power cable 20 has the insertion terminal 21 provided at one end thereof detachably coupled in the aforementioned insertion hole 11, and the charging object 22 connected to the other end. When the insertion terminal 21 and the insertion hole 11 are electrically connected, the charging object 22 is charged by the main body 10 in which the plug is inserted into an outlet.

The other end of the power cable 20 may be integrally connected to the charging object 22, and may be detachably provided with the charging object 22 as illustrated in the drawings. The other end of the power cable 20 is also further provided with the insertion terminal 21 that may be coupled to the charging object 22. In addition, the aforementioned insertion terminal 21 of the power cable 20 may further include an adapter 23 that may be inserted into the insertion hole 11. In other words, when the insertion terminal 21 is not in a shape that may be inserted into the insertion hole 11, the insertion terminal 21 is inserted at one end and the adapter 23 that may be inserted into the other end of the insertion hole 11 is used. The insertion terminal 21 and the adapter 23 have a magnetic body 24 provided therein and are detachably coupled to the metal member 12 built in the insertion hole 11 through mutual magnetic force.

In some embodiments, a magnetic body (not shown) is provided within a circumference of the insertion hole 11 instead of the metal member 12, and a corresponding magnetic body 24 is also provided within a circumference of the insertion terminal 21 and the adapter 23. In this case, both ends of the magnetic body 24 of the insertion terminal 21 and the adapter 23 may be formed to have different polarities. Both ends of the magnetic body (not shown) of the insertion hole 11 may also be formed to have different polarities to generate attractive forces from both ends of the magnetic body 24 of the insertion terminal 21 and the adapter 23, respectively. Accordingly, in a state in which the top and bottom or left and right sides of the insertion hole 11, the insertion terminal 21 or the adapter 23 are reversed, repulsive force is generated between the magnetic bodies 24, so that it is difficult to couple each other. In other words, the insertion hole 11, the insertion terminal 21 or the adapter 23 may be coupled only in a direction determined according to the polarities of the magnetic bodies 24.

In addition, referring to FIG. 3, the plug terminal 13 provided in the aforementioned main body 10 serves to allow the main body 10 to be connected to an external power source to be charged. The plug terminal 13 may be replaced with a corresponding one according to a shape of the outlet. For example, as illustrated in the drawings, when the standard voltage is 220V, the plug terminal 13 that may be inserted into a 220V outlet is used in combination with the main body 10. When the standard voltage is 110V, the plug terminal 13 that may be inserted into a 220V outlet is separated from the main body 10 and the plug terminal 13 that may be inserted into a 110V outlet may be rotated from the main body 10 to be used. Accordingly, the plug terminal may be used not only in Korea but also abroad with different outlet standards.

Hereinafter, the overall usage of the free voltage adapter 1 for charging according to an embodiment disclosed herein will be described with reference to FIG. 4 in detail.

As the plug terminal 13 of the main body 10 is coupled to an external power outlet, power may be supplied. Then, the insertion terminal 21 of the power cable 20 to which the charging object 22 is connected is coupled to the insertion hole 11 of the main body 10. The metal member 12 is built in the insertion hole 11, and the magnetic body 24 is built in the insertion terminal 21, so that both sides are detachably coupled through mutual magnetic force. When the insertion terminal 21 has a shape that may not be coupled to the insertion hole 11, the available adapter 23 is coupled.

When the power cable 20 is connected to the main body 10, the charging control circuit board 14 flows a fine current to the battery side of the charging object 22 to determine the charging voltage of the corresponding battery. Based thereon, the charging is started by supplying the charging voltage corresponding to the battery. When the charging is started, the charging capacity is displayed on the display 15 of the main body 10 in real-time, and simultaneously, the life of the corresponding battery may also be displayed. When the charging is finished, the supply of the charging voltage is automatically cut off by the charging control circuit board 14, and the charging completion is displayed on the display 15.

According to the free voltage adapter 1 for charging as described above, when the free voltage adapter is connected to a charging object 22 for charging, a voltage required for charging the charging object 22 is first predicted in advance, and after that, a voltage corresponding to the charging voltage of the charging object 22 is supplied, thus with a single adapter, a plurality of different types of charging objects 22 with different charging voltages can be charged simultaneously.

While the present disclosure has been described with reference to exemplary embodiments, it will be apparent to those skilled in the art that various changes and modifications may be made without departing from the spirit and scope of the present disclosure. Therefore, it should be understood that the above embodiments are not limiting, but illustrative.

What is claimed is:

1. A free voltage adapter for charging, comprising:
   a main body provided with two or more insertion holes on one side, a plug terminal inserted into an outlet on an other side of the main body, and a charging control circuit board provided therein; and
   a power cable in which when one end of the cable is detachably coupled to the insertion holes and an other end of the cable is connected to a charging object so that the one end is connected to the insertion holes, the charging object is charged by the main body in which the plug terminal is inserted into the outlet,
   wherein the plug terminal is replaced with a corresponding one according to a shape of the outlet,
   wherein a display for displaying a charging state is provided on one side of the main body, and
   wherein the charging control circuit board is configured to apply an AC signal having a single frequency to a battery of the charging object, measure an AC impedance of the battery, and predict a life of the battery using the measured AC impedance, and
   wherein the display is configured to display the predicted battery life.

2. The free voltage adapter for charging according to claim 1, wherein the charging control circuit board is configured to flow a fine current to the battery of the charging object, sense a connection with the battery of the charging object to check a battery capacity of the charging object, supply a charging voltage matched to the battery capacity of the charging object.

3. The free voltage adapter for charging according to claim 1, wherein an adapter that is configured to be inserted into the insertion holes is provided at one end of the power cable.

4. The free voltage adapter for charging according to claim 3, wherein a metal member is built in the insertion holes, and the insertion terminal and the adapter provided at one end of the power cable are provided with a magnetic body that is detachably coupled to the metal member through magnetic force.

5. The free voltage adapter for charging according to claim 1, wherein the other end of the power cable is integrally connected to the charging object or is detachably provided with the charging object.

6. The free voltage adapter for charging according to claim 1, wherein the charging control circuit board is further configured to automatically cut off a charging voltage when charging is finished.

7. The free voltage adapter for charging according to claim 1, wherein the display is configured to simultaneously display the predicted battery life, and a charging state and charging time of the battery of the charging object.

\* \* \* \* \*